United States Patent
Mancil

[11] Patent Number: 5,843,309
[45] Date of Patent: Dec. 1, 1998

[54] WATER PURIFICATION SYSTEM

[75] Inventor: Philip W. Mancil, Plano, Tex.

[73] Assignee: Puragua, Inc., Plano, Tex.

[21] Appl. No.: 542,559

[22] Filed: Oct. 13, 1995

[51] Int. Cl.[6] .................................................. B01D 35/00
[52] U.S. Cl. .......................... 210/205; 210/256; 210/472; 422/186.3
[58] Field of Search .............................. 210/748, 85, 192, 210/198.1, 205, 256, 472; 422/24, 186.3

[56] References Cited

U.S. PATENT DOCUMENTS

| | | | |
|---|---|---|---|
| 3,923,663 | 12/1975 | Reid | 210/251 |
| 4,849,100 | 7/1989 | Papandrea | 210/192 |
| 4,956,754 | 9/1990 | Chen | 210/169 |
| 4,968,437 | 11/1990 | Noll et al. | 210/748 |
| 4,971,687 | 11/1990 | Anderson | 210/85 |
| 5,026,477 | 6/1991 | Yen | 210/192 |
| 5,227,053 | 7/1993 | Brym | 210/748 |
| 5,393,419 | 2/1995 | Tiede et al. | 210/192 |
| 5,597,482 | 1/1997 | Melyon | 210/209 |

*Primary Examiner*—Jay H. Woo
*Assistant Examiner*—Betsey J. Morrison
*Attorney, Agent, or Firm*—Hill, Johnson & Schmutz

[57] ABSTRACT

A water purification system utilizes a radial filter and an ultraviolet lamp in a small, portable, countertop housing. A standpipe is positioned between the filter and the ultraviolet lamp to control the flow of water so that it flows along substantially the entire length of the UV lamp. The lamp is made integral with a quartz-tube covering and a threaded cap and connector to enable replacement of the UV lamp assembly. The housing encompassing the filter system is also easily disassembled to enable cleaning of the housing and replacement of the filter. A pressure vent is provided in the housing cover to equalize pressure and provide for a water level differential when the filter is disabled. A UV lamp indicator is included to show that the lamp is in operation.

19 Claims, 7 Drawing Sheets

WATER PURIFICATION SYSTEM

BACKGROUND OF THE INVENTION

1. Field of the Invention

This invention relates to water purification systems and, more particularly, to water purification systems using filtration and ultraviolet radiation apparatus to purify the water.

2. Description of the Prior Art

It is known to use ultraviolet (UV) radiation to disinfect drinking water. The United States Department of Health, Education and Welfare Public Health Service recognizes that ultraviolet radiation is a means for meeting the bacteriological requirements of the Public Health Service Drinking Water Standards. Studies have indicated that ultraviolet radiation at a level of 2,537 Angstrom units applied at a minimum dosage of 16,000 micro-watt-seconds per square centimeter at all points throughout a water disinfection chamber is adequate to purify water for drinking. Industry has set its own standard of 30,000 micro-watt-seconds to account for any losses that may occur in the chamber. If one uses a UV lamp that has a guarantee of maintaining 80% power over 9,000 hours (one year) then setting a standard of 38,000 micro-watt-seconds per square centimeter would insure that the lamp would require replacement no more than yearly, while adequately sterilizing water flow exposed to the UV lamp.

Many rural areas in the United States and throughout the world do not have high water pressure and do not have a reliable water source. For instance, people who depend on cisterns or well water may have good water today and contaminated water tomorrow. Many of these systems use gravity as the source of water pressure or have well pumps that are only a slight improvement.

In U.S. Pat. No. 4,968,437 to Electrolux a sterilization system employs two plastic tubes at least six feet in length having a cross-sectional area of about 0.2 square inches. The tubes are wrapped spirally, interleaved around an ultraviolet-light-producing lamp, and connected in series with a filter between them. The apparatus disclosed in the Electrolux '437 patent may be suitable for some applications, but there are applications where it is not practical.

First, if the water being treated is turbid the first plastic tube will be ineffective because there is no pre-filter. The UV light will not be able to pass through the water and will not be entirely effective in destroying all microorganisms. Moreover, because there is no pre-filter, material passing through the first plastic tube can accumulate on the inside surface of the tube. The accumulation can render the first tube ineffective over time by restricting the transmittance of the UV radiation through the tube. This would require frequent inspection and cleaning/replacement of the tube system.

In addition, the transmission characteristics of plastic for ultraviolet radiation are significantly lower than those of quartz or high-silica glass recommended by the U.S. Public Health Service. Thus, the ultraviolet lamp would need to be quite large to overcome the losses built into the system. The absorption of the UV radiation by the plastic is called solarization and becomes worse as the plastic ages, producing darkening of the material and increasing the absorption rate of UV radiation.

Another problem with an Electrolux-type system is that the water must travel through at least 12 feet of tubing which is approximately 0.2 inches in cross-sectional area, causing significant losses in water pressure. The filter adds to the pressure losses so that the flow rate would likely drop to a point that makes the unit undesirable for low pressure applications. Moreover, the size of the Electrolux '437 unit and hookup method make it impractical for a counter-top unit.

Another prior art system shown in FIG. 1 utilizes a radial-flow carbon cartridge and a ultraviolet lamp in the center. In this system, the water can flow at any point along the carbon cartridge into proximity with the ultraviolet lamp and then to the output. Thus, the flow of at least part of the water can substantially bypass the ultraviolet lamp at or near the input to the filter, thereby contaminating the water flowing out of the filter.

As shown in FIG. 1, the water enters at input port 1 and fills up the housing. It then travels through the filter 2 and passes the ultraviolet lamp 3 before exiting at output port 4. Because the water will take the path of least resistance, some of it will cross the filter 2 at the top and have a shorter path past the ultraviolet lamp 3 to the exit port 4.

Another problem with this prior art filter is that the ultraviolet light is radiated directly on the plastic housing of the filter medium. By continued exposure to UV light, the plastic housing will break down and release some of its component material into the water.

SUMMARY OF THE INVENTION

The present invention provides a countertop water filter system that is effective for low pressure systems as well as for normal pressure systems common in most households. This system provides high-quality, purified, potable water which is substantially free of all living microorganisms. This system of the present invention is modular, with the capability to be expanded and/or modified to meet the specific needs of the user.

The system of the present invention has simple maintenance procedures which keeps the overall cost of system operation low. This unit is relatively small and portable. Maintenance can be done on a regular basis by a layman without a technician's assistance. The present system can also be installed by a layman and does not require the services of a plumber or electrician. Installation is accomplished by removing the aerator from the sink faucet and replacing it with an diverter/aerator having a tube which connects to the filter system. The system is hooked up electrically by connecting the four-pin plug on top of the unit with the plug on the end of the ballast cable. The ballast is then plugged into a wall outlet in the same manner that most countertop appliances are connected.

In one preferred form of the present invention, the water purification system comprises an enclosed housing assembly having a base with inlet and outlet ports for water flow. A standpipe is disposed in the base over the outlet port. A radial filter is disposed circumferentially around the standpipe and is sealed by a housing cover to the ends of the filter to prevent water from bypassing the filter. An ultraviolet lamp assembly is connected to the top of the cover and extends through the center of the standpipe. A vent check valve is installed in the top of the cover. A faucet is screwed on the base at the output port.

Another alternate embodiment of the present invention provides for dual modules as described above connected in a series. Yet another embodiment provides for one unit described above connected in tandem with a post-filter module not having the ultraviolet lamp assembly. Another embodiment of the present invention includes a pre-filter attached in series to the filter module described above.

In operation, the diverter/aerator is selected to the filter after turning on the water faucet. The water enters the filter housing and passes through the filter medium where particulate matter and unwanted chemicals are removed. As the housing fills up, the water reaches the level of the standpipe and overflows. The overflowing water passes along the entire length of the ultraviolet lamp where it is radiated with high intensity ultraviolet light, killing the microorganisms present in the water. The water then flows up and out of the purifier faucet for consumption. When the water is shut off, the housing vents to the atmosphere through the vent check valve. The water level in the housing drops to the top of the standpipe, and the water level in the standpipe drops to the level of the top of the output faucet. This difference in water levels provides a barrier between the untreated water and treated water. If power to the system is lost, the integrity of the system against microorganisms is maintained by this barrier.

The pre-filter in the present system eliminates turbidity of the water and keeps the ultraviolet lamp assembly clean. The clear water does not restrict the transmittance of the ultraviolet radiation. By keeping the water clean the UV lamp remains clean longer, thus operating at top radiation efficiency. The present invention utilizes a quartz, high-silica tube encasing the UV lamp to maintain its clarity throughout the lifetime of the lamp, reduce solarizing, and keep the ultraviolet radiation at peak efficiency. By allowing the water to flow around the total circumference of the UV lamp at the same time, back pressure is kept to a minimum, enabling use of unit at low pressures. The small size of the unit and ease of hookup enable the use of the filter of the present invention for countertop and portable applications.

The modularity of the present system enables it to be modified to meet the needs of specific users. For instance, if lead in the water is an additional problem, the filter media can be changed to accommodate the problem. If the flow rate needs to be increased, additional units can be connected in series.

DETAILED DESCRIPTION

Figure 2:
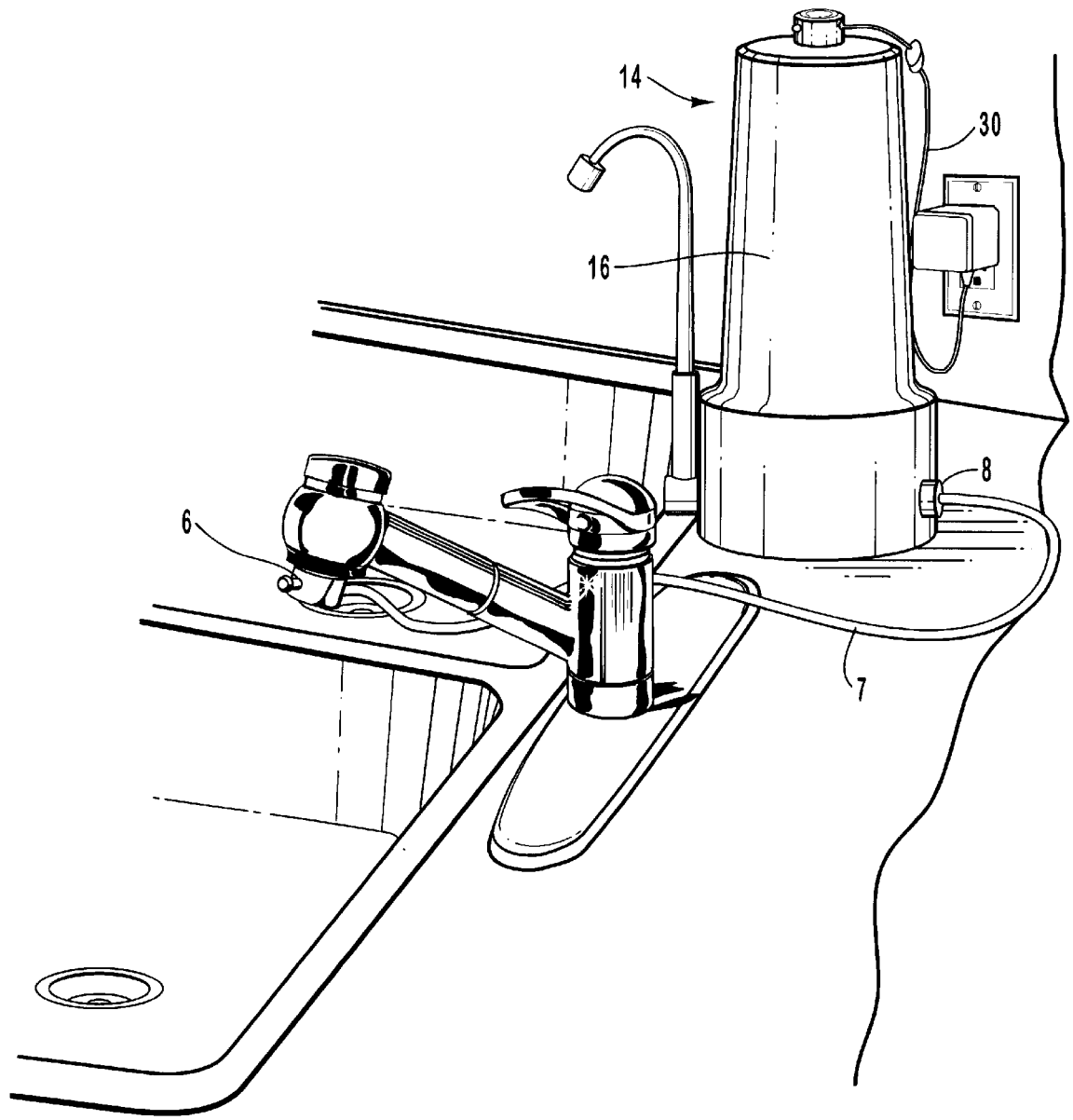
FIG. 2 shows a system of the present invention hooked up to a household faucet and power outlet.

FIG. 2 shows the hookup of one preferred embodiment of the water purification system. The system is small and portable, and it fits easily on most counter tops. The diverter/aerator 6 is connected to the sink faucet in place of the standard aerator. A tube 7 connects the diverter/aerator 6 to the base of the housing 16 of filter assembly 14. A cord 30 for the power supply plugs into a conventional electrical outlet.

Figure 3:
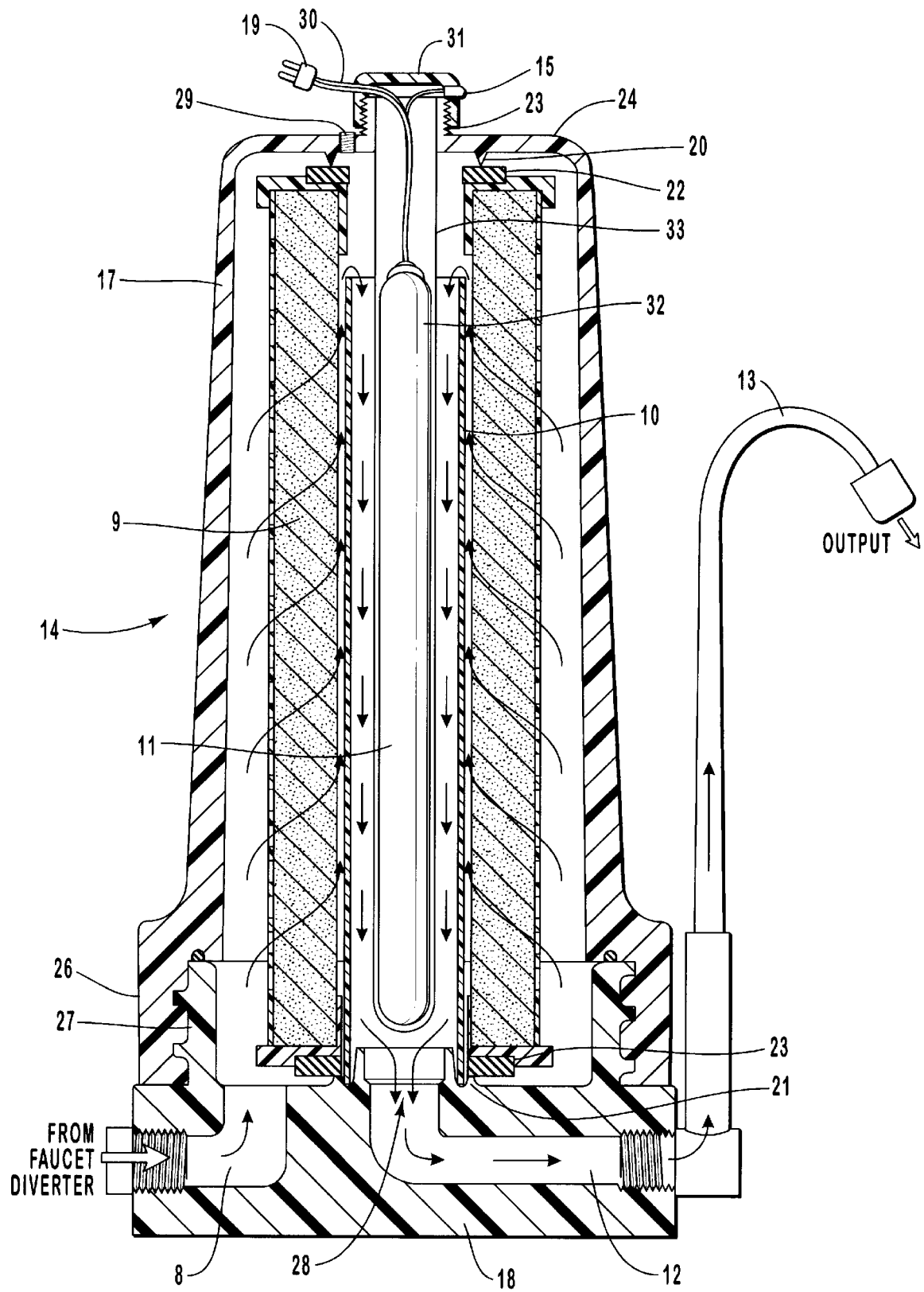
FIG. 3 is a cutaway view of the filter system of the present invention showing the flow path of the water.
Figure 4:
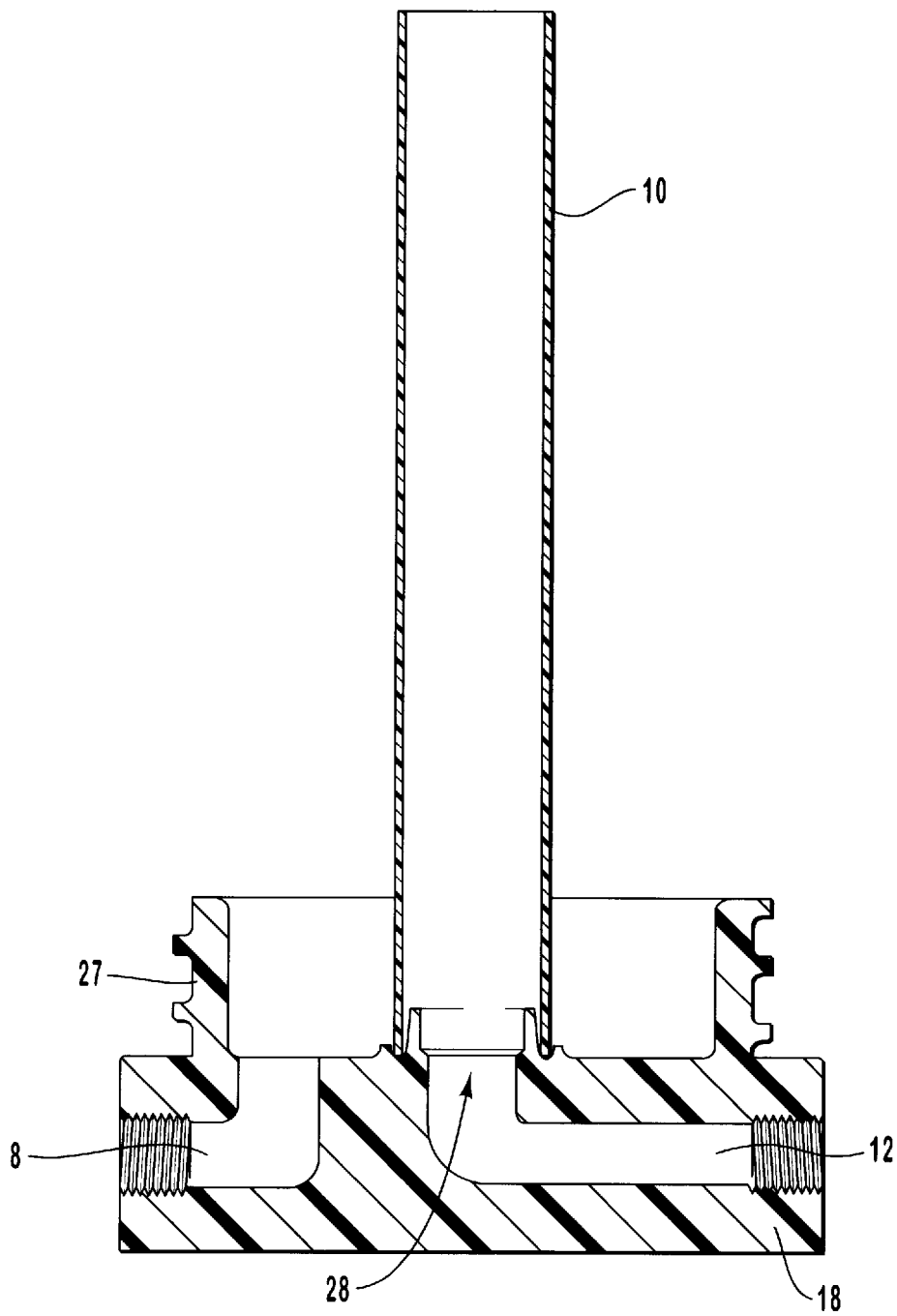
FIG. 4 is a cutaway view of the base and standpipe of the filter system shown in FIG. 3.

Referring to FIG. 3, the housing 16 of filter assembly 14 includes a base 18 having an input water port 8 and an output water port 12. A standpipe 10 is installed in the center of the base 18 over an orifice 28 leading to the outlet port 12, as also shown in FIG. 4. The radial filter 9 is disposed concentrically around the standpipe 10. The cover 17 has a female-threaded flange 26 which screws on to a male-threaded portion 27 of base 18. Circular rings 20 and 21 impinge against rubber seals 22 and 23 to clamp and seal the ends of the filter 9 to prevent water from bypassing the filter.

The ultraviolet lamp assembly 11 includes an ultraviolet lamp 32 connected to a power cord 30. A clear tube 33, having a diameter slightly larger than lamp 32, concentrically surrounds lamp 32. The upper end of tube 33 extends through a hollow threaded connector 25 and is secured thereto by an adhesive. Connector 25 extends through a threaded opening in top 24 and terminates in a threaded cap 31. Two holes are drilled in cap 31, one for power cable 30 running to connector 19, and the other hole for the UV power indicator 15. Lamp assembly 11 is thus connected in the top 24 of the cover 17 so that the assembly extends down the center of standpipe 10. A vent check valve 29 is installed in the top 24 of the cover. A faucet 13 is screwed on the base at the output port.

Figure 1:
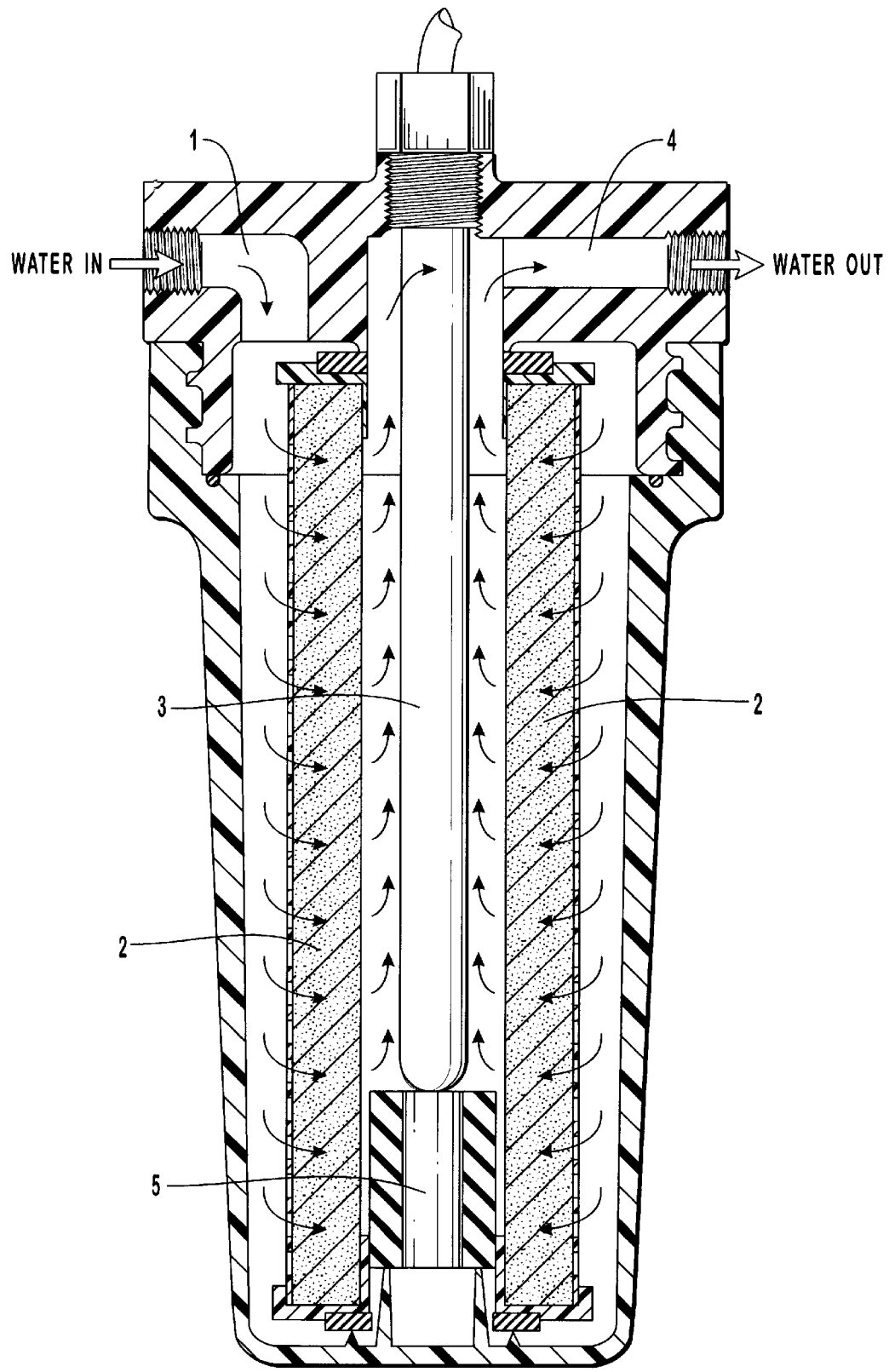
FIG. 1 is a cutaway view of a prior art ultraviolet filter system.

The standpipe 10 prevents the water from bypassing the ultraviolet lamp assembly 11 or taking a shortcut as in the prior art (See FIG. 1). The standpipe 10 is preferably made of teflon or metal such as, but not limited to, copper or stainless steel to prevent the breakdown that occurs from exposure of other materials to ultraviolet radiation. Alternately, standpipe 10 may be made of plastic and coated with metal. A secondary purpose of the standpipe is to shield the filter from the ultraviolet radiation. The plastic webbing material covering the filter will break down with extended exposure to high intensity UV radiation, thus releasing potentially harmful component materials into the water.

As shown in FIGS. 2 and 3, the water that is diverted from the sink faucet passes through the tubing 7 and enters the housing at the input port 8. The water rises in the housing and passes through the filter medium 9, removing undesirable particulate matter and chemicals. The filtered water then rises to the top of the standpipe 10 and flows down toward the output orifice 28. With the ultraviolet lamp assembly 11 in the center of the standpipe 10, the filtered water is exposed to maximum radiation for the full length of the standpipe thereby destroying the living microorganisms in the water. The purified water exits the housing at the output port 12 and passes through the faucet 13.

When the water supply is turned off, the housing assembly is vented to the atmosphere through vent check valve 29. This vent equalizes the pressures inside the housing and allows the water inside to drain through the faucet 13. The water level inside the housing will drop until it reaches the top of the standpipe 10. This water level inside the standpipe 10 will continue to drop until it reaches the same level as the top of the faucet 13. This separation divides the sterilized and unsterilized water and prevents contamination of the output port and the faucet in the event of a power outage.

The tube 33 which covers and protects the ultraviolet lamp 32 is preferably a conventional quartz tube. The UV power indicator 15 is made of a translucent piece of plastic that radiates the reflected light from the UV lamp. Vent check valve 29 is preferably a conventional unit, such as model number A627 made by Miniature Precision Components located in Walworth, Wis.

The UV lamp 32 is preferably a conventional unit, model number GPH212T5L made by Light Sources, Inc. of Milford, Conn. and modified as shown. The activated carbon filter 9 is preferably a conventional unit such as model number S1035-1 made by Clack, Inc. of Windsor, Wis. The housing assembly, including the cover and base, is preferably a plastic unit called Hydro-Cure Housing made by Clack, Inc. and modified as shown.

Two types of maintenance activities are required for this system. One is replacement of the ultraviolet lamp assembly 11 and the other is the replacement of the filter medium 9 and cleaning of the system. For replacement of the ultraviolet lamp assembly 11, the power connector 19 is disconnected from the ballast cable 30 and the assembly 11 is unscrewed from the top 24 of the housing cover 17. The cap 31, lamp 32, and quartz tube 33 are integrally formed as one assembly to reduce the possibility of breaking fragile components such as the ultraviolet lamp. After removal of the old lamp assembly 11, the new part is removed from the package, inserted through the opening in the top 24 of the housing cover 17 and screwed in. The power connector 19 is then plugged into the ballast cable 30 and the unit is ready for operation.

For replacement of the filter and for cleaning the unit, the ultraviolet lamp assembly 11 is removed as described above and the housing assembly 16 is placed horizontally over the sink. The housing cover 17 is unscrewed from the base 18 and set aside. The old filter 9 is lifted off from over the standpipe 10 and is discarded. The inside of the filter housing cover 17 is washed with a mild detergent and the standpipe 10 is cleaned with a bottle brush. Upon completion of cleaning the standpipe 10, a disinfecting solution is poured through to insure that the exit port 12 and the faucet 13 remain uncontaminated. The replacement filter 9 is then installed over the standpipe 10 and the housing cover 17 is then screwed on to base 18. The ultraviolet lamp assembly 11 is then reinstalled as described above.

Figure 5:
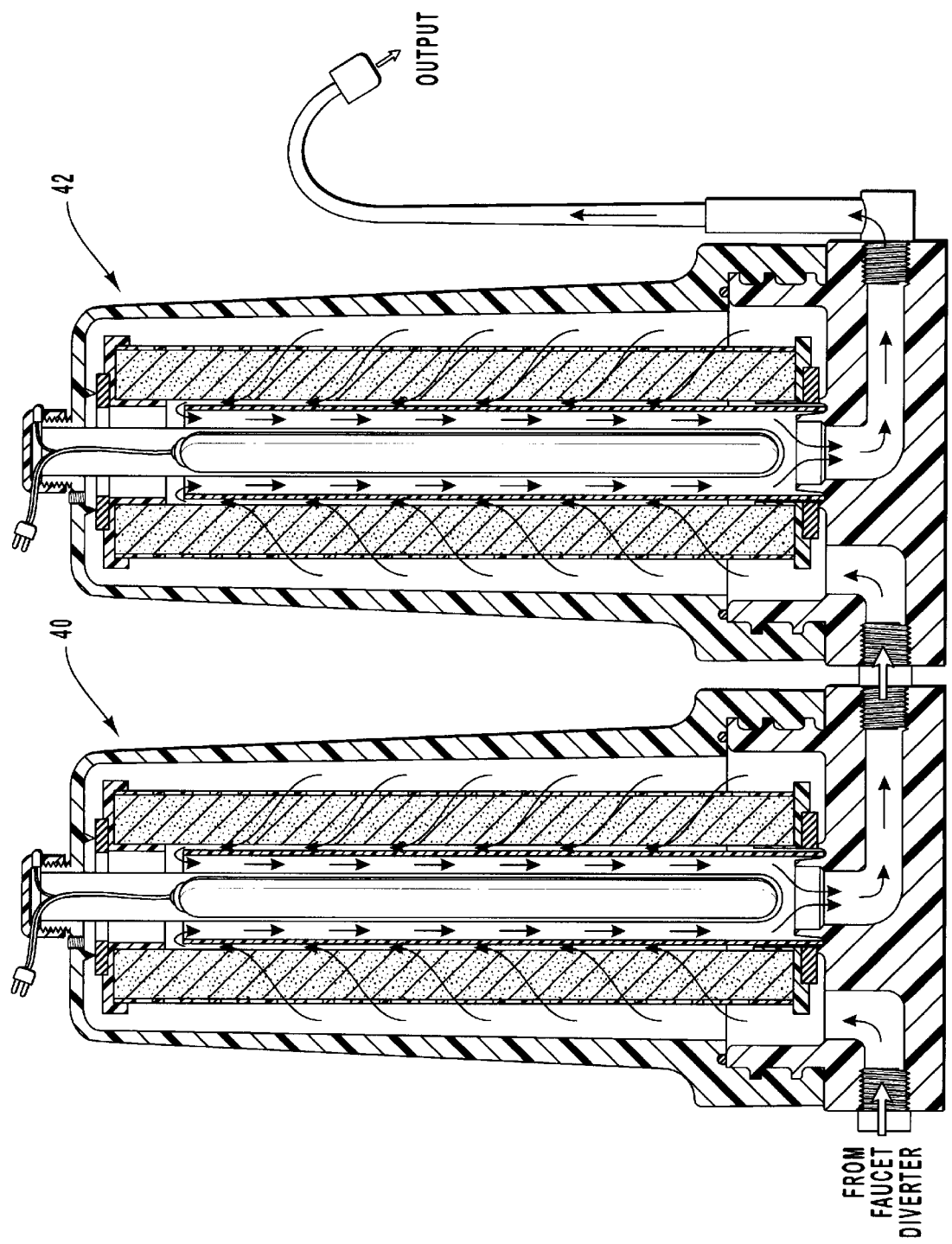
FIG. 5 is a cutaway view of an alternate configuration of the filter/sterilization system of the present invention, having two ultraviolet modules in series.

Another embodiment of the filter of the present invention appears in FIG. 5 in which two filter units 40 and 42 are connected in series. Each unit 40 and 42 are identical to the filter system 14 shown in FIG. 3. By connecting the units in series, the amount of ultraviolet radiation is doubled, thus allowing the flow rate to be increased by a factor of two. At the same time, different types of filters may be used to treat different problems. For instance, the first filter may be for lead removal while the second could be for odor and taste.

Figure 6:
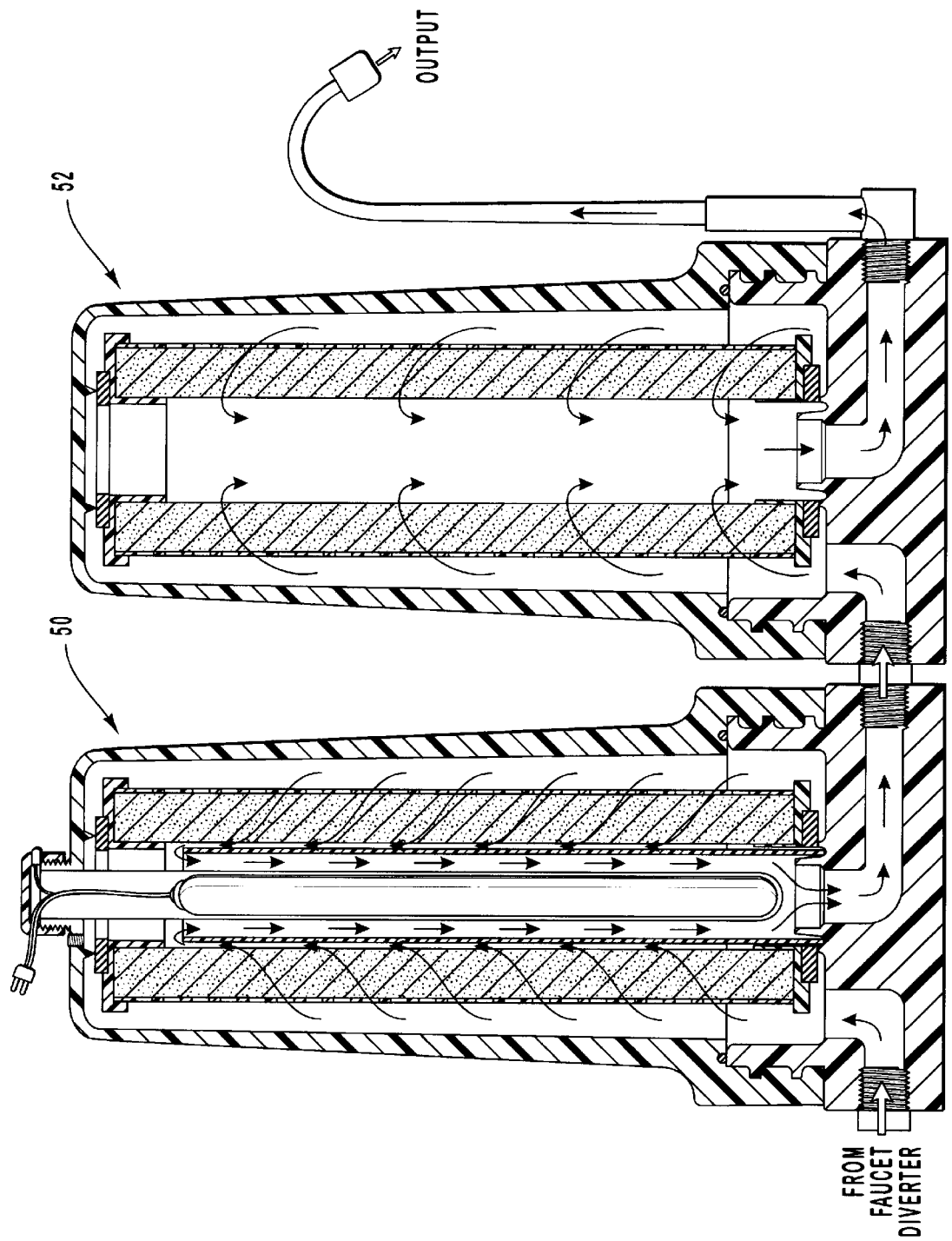
FIG. 6 is a cutaway view of an alternate configuration of the filter system of the present invention having an ultraviolet module in series with a post-filter module.

Another embodiment shown in FIG. 6 utilizes one assembly 50 identical to filter assembly 14 and a second unit 52 connected in series with assembly 50 and identical to filter assembly 14 except it does not have a UV lamp assembly 11 or a standpipe 10. This approach allows two separate filter problems such as those described above to be addressed while minimizing costs by using only one ultraviolet lamp.

Figure 7:
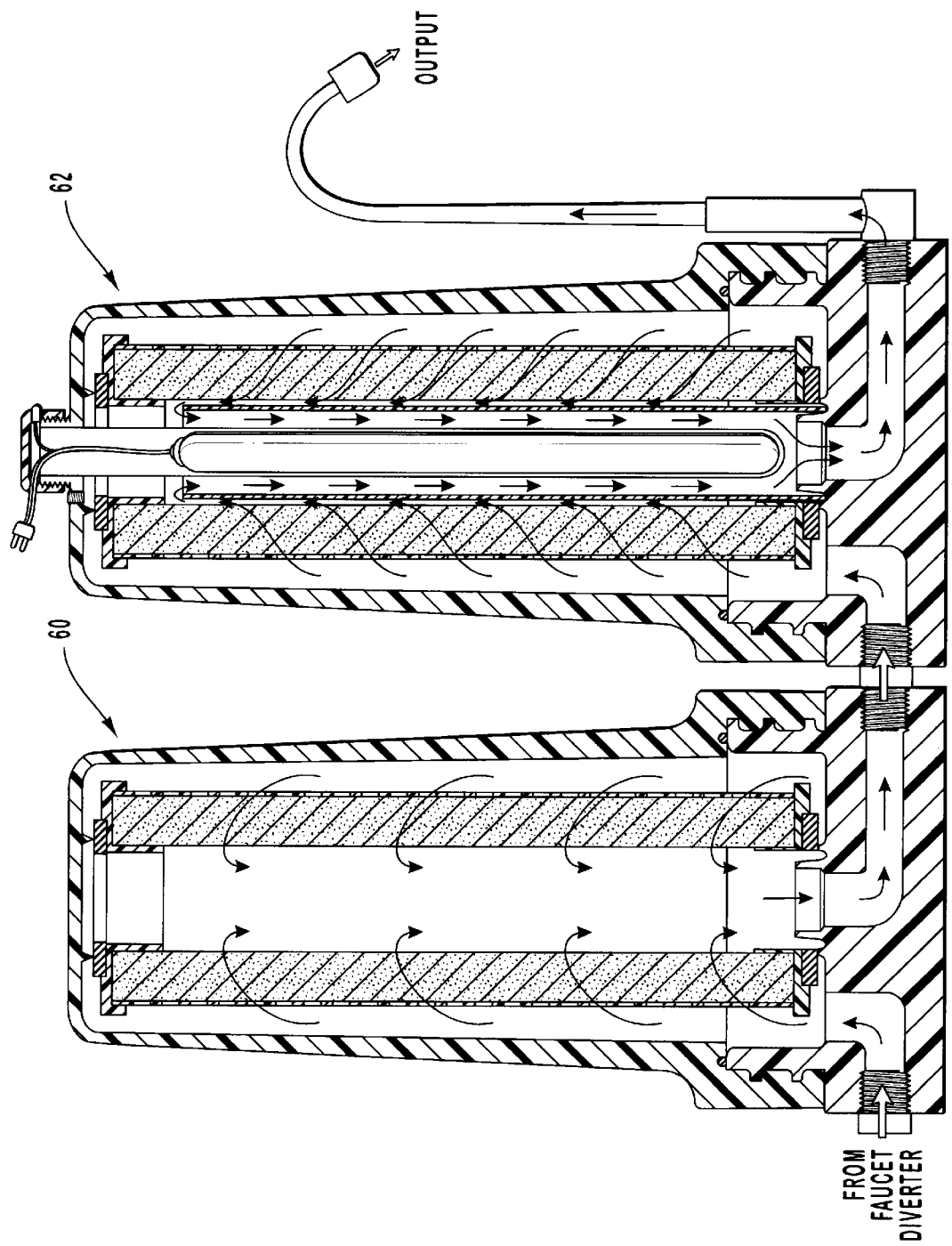
FIG. 7 is a cutaway view of an alternate configuration of the filter system of the present invention having a pre-filter module in series with an ultraviolet module.

Yet another embodiment is shown in FIG. 7 which also provides for two units in tandem. The first unit 60 is a pre-filter assembly without the ultraviolet lamp assembly, identical to unit 52. The second unit 62 is identical to filter assembly 14. It is likely to be most useful in situations where the water requires extra filtering in order to make the water pure enough to expose to UV light.

It is understood that the present invention is not limited to the embodiments described above. Various other changes and modifications may be made by one skilled in the art without departing from the scope or spirit of the present invention.

What is claimed is:

1. A water filter system comprising:
   (a) a housing assembly having an inlet port and an outlet port for directing water flow through the housing;
   (b) a filter disposed in the housing between the inlet port and the outlet port;
   (c) an ultraviolet lamp disposed in the housing between the filter and the outlet port;
   (d) shield means between the filter and the ultraviolet lamp for channeling the water flow adjacent substantially the entire length of the lamp and for shielding the filter from ultraviolet radiation; and
   (e) a venting means in the housing assembly to equalize pressure therein for separating the treated water from the untreated water within the housing when the water flow through the housing stops.

2. The filter system of claim 1 wherein the channeling means comprises a pipe extending adjacent to the lamp.

3. The filter system of claim 2 wherein the pipe is tubular-shaped and concentrically surrounds the lamp.

4. The filter system of claim 1 wherein the filter is tubular-shaped and concentrically surrounds the lamp and the channeling means.

5. The filter system of claim 1 and further comprising a clear casing substantially surrounding the lamp disposed between the lamp and the channeling means.

6. The filter system of claim 1 and further including seal means between the housing and the filter to force the water flow from the inlet port through the filter.

7. The filter system of claim 1 and further comprising indicator means in the housing for displaying an indication that the ultraviolet lamp is activated.

8. The filter system of claim 1 and further comprising means for connecting the lamp to the housing.

9. The filter system of claim 1 wherein the filter is tubular-shaped and concentrically encompasses the channeling means, and the channeling means is tubular-shaped and concentrically encompasses the lamp.

10. A water purification system comprising:
    (a) an elongated, hollow housing having a water inlet port and a water outlet port;
    (b) a tubular-shaped filter disposed within the housing;
    (c) a tubular-shaped pipe disposed within the filter;
    (d) a tubular-shaped ultraviolet lamp disposed within the pipe so that the pipe runs substantially the entire length of the lamp,
    (e) the pipe being closed at a first end and being open at a second end to enable water flow to pass through the second end and adjacent to the length of the lamp, the pipe being impervious to ultraviolet radiation to shield the filter therefrom; and
    (f) venting means in the housing assembly to equalize pressure therein for separating the treated water from the untreated water within the housing, so that when the water flow through the water inlet port stops, the water level in the pipe drops below the open end of the pipe.

11. The water purification system of claim 10 wherein the first end of the pipe is closest to the outlet port and the second end of the pipe is remote from the outlet port, so that the water flow through the second end of the pipe flows substantially the entire length of the lamp.

12. The water purification system of claim 10 wherein the filter is in sealed connection with the housing at both ends of the filter so that the water flow into the housing is forced through the filter.

13. The water purification system of claim 10 and further comprising a quartz tube shielding substantially the entire length of the lamp.

14. The water purification system of claim 10 wherein the system is portable and adapted to be disposed on a countertop with the inlet port being adapted for connection to a faucet diverter and the outlet port being adapted for connection to a faucet.

15. The water purification system of claim 10 and further comprising a second water purification system connected in tandem to the first system so that the outlet port of the first system is connected to the inlet port of the second system.

16. The water purification system of claim 15 wherein the second system is identical to the first system.

17. The water purification system of claim 15 wherein the second system is a filter unit which has only a tubular filter therein.

18. The water purification system of claim 15 wherein the first and second system are reversed in order so that the water flow goes first through the filter unit and then through the system having an ultraviolet lamp therein.

19. A water filter system comprising:

(a) a housing assembly having an inlet port and an outlet port in the base of the housing for directing water flow through the housing, the outlet port being in communication with an outlet faucet;

(b) a replaceable filter disposed in the housing between the inlet port and the outlet port;

(c) an ultraviolet lamp disposed in the housing between the filter and the outlet port;

(d) pipe means attached to the base of the housing assembly, disposed between the filter and the ultraviolet lamp and having an opening at the top of the pipe means for channeling the water flow adjacent substantially the entire length of the lamp, and (e) a vent in the housing assembly to equalize pressure therein for separating the treated water from the untreated water within the housing, so that when the water flow through the inlet port stops, the water level in the pipe means drops to the level of the outlet faucet.

* * * * *